United States Patent
Perkins et al.

(10) Patent No.: US 10,528,051 B1
(45) Date of Patent: *Jan. 7, 2020

(54) AUTO-HEIGHT SWING ADJUSTMENT

(71) Applicant: Boston Dynamics, Inc., Waltham, MA (US)

(72) Inventors: Alexander Douglas Perkins, Arlington, MA (US); Kevin Blankespoor, Arlington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 199 days.

This patent is subject to a terminal disclaimer.

(21) Appl. No.: 15/416,361

(22) Filed: Jan. 26, 2017

Related U.S. Application Data

(63) Continuation of application No. 14/709,830, filed on May 12, 2015, now Pat. No. 9,594,377.

(51) Int. Cl.
G05D 1/02 (2006.01)
B25J 9/16 (2006.01)
B62D 57/032 (2006.01)

(52) U.S. Cl.
CPC .......... *G05D 1/0212* (2013.01); *B25J 9/1664* (2013.01); *B62D 57/032* (2013.01); *Y10S 901/01* (2013.01)

(58) Field of Classification Search
CPC .... G05D 1/02; G05D 2201/0217; G05D 1/12; G05D 2201/0208; G05D 1/0246;
(Continued)

(56) References Cited

U.S. PATENT DOCUMENTS 4,834,200 A 5/1989 Kajita
5,151,859 A 9/1992 Yoshino et al.
(Continued)

FOREIGN PATENT DOCUMENTS

KR 100815247 3/2008

OTHER PUBLICATIONS

Abe et al., "Multiobjective Control with Frictional Contacts," Eurographics/ACM SIGGRAPH Symposium on Computer Animation, Aug. 4-5, 2007, San Diego, California, 10 pages.
(Continued)

*Primary Examiner* — Hunter B Lonsberry
*Assistant Examiner* — Luis A Martinez Borrero
(74) *Attorney, Agent, or Firm* — Honigman LLP

(57) ABSTRACT

An example implementation includes (i) receiving sensor data that indicates topographical features of an environment in which a robotic device is operating, (ii) processing the sensor data into a topographical map that includes a two-dimensional matrix of discrete cells, the discrete cells indicating sample heights of respective portions of the environment, (iii) determining, for a first foot of the robotic device, a first step path extending from a first lift-off location to a first touch-down location, (iv) identifying, within the topographical map, a first scan patch of cells that encompass the first step path, (v) determining a first high point among the first scan patch of cells; and (vi) during the first step, directing the robotic device to lift the first foot to a first swing height that is higher than the determined first high point.

17 Claims, 7 Drawing Sheets

(58) Field of Classification Search
CPC ...... G05D 1/08; G05D 1/0212; G05D 1/0251; G05D 1/0214; Y10S 320/34; Y10S 700/90; Y10S 901/00–50; Y10S 901/01; B62D 57/02; B62D 57/022–032; B25J 9/1664
See application file for complete search history.

(56) References Cited

U.S. PATENT DOCUMENTS

| | | | |
|---|---|---|---|
| 5,343,397 A | 8/1994 | Yoshino et al. | |
| 5,355,064 A | 10/1994 | Yoshino et al. | |
| 5,416,393 A | 5/1995 | Gomi et al. | |
| 5,432,417 A | 7/1995 | Takenaka et al. | |
| 5,459,659 A | 10/1995 | Takenaka | |
| 5,513,106 A | 4/1996 | Yoshino et al. | |
| 5,644,204 A | 7/1997 | Nagle | |
| 5,737,217 A | 4/1998 | Nishikawa et al. | |
| 5,762,153 A | 6/1998 | Zamagni | |
| 5,808,433 A | 9/1998 | Tagami et al. | |
| 5,838,130 A | 11/1998 | Ozawa | |
| 5,974,366 A | 10/1999 | Kawai et al. | |
| 6,021,363 A | 2/2000 | Nishikawa et al. | |
| 6,064,167 A | 5/2000 | Takenaka et al. | |
| 6,177,776 B1 | 1/2001 | Kawai et al. | |
| 6,317,652 B1* | 11/2001 | Osada | B25J 19/023 318/568.1 |
| 6,374,157 B1 | 4/2002 | Takamura | |
| 6,484,068 B1 | 11/2002 | Yamamoto et al. | |
| 6,493,607 B1 | 12/2002 | Bourne et al. | |
| 6,534,943 B1* | 3/2003 | Hornby | B62D 57/032 318/568.1 |
| 6,584,377 B2* | 6/2003 | Saijo | B25J 13/00 318/561 |
| 6,640,160 B2* | 10/2003 | Takahashi | B25J 19/005 318/568.1 |
| 6,697,709 B2* | 2/2004 | Kuroki | B62D 57/032 700/245 |
| 6,802,382 B2* | 10/2004 | Hattori | B62D 57/032 180/8.6 |
| 6,832,132 B2* | 12/2004 | Ishida | B62D 57/032 180/8.1 |
| 6,943,520 B2 | 9/2005 | Furuta et al. | |
| 6,992,455 B2 | 1/2006 | Kato et al. | |
| 6,992,457 B2 | 1/2006 | Furuta et al. | |
| 6,999,851 B2 | 2/2006 | Kato et al. | |
| 7,013,201 B2 | 3/2006 | Hattori et al. | |
| 7,076,331 B1 | 7/2006 | Nagatsuka et al. | |
| 7,096,983 B2* | 8/2006 | Hirai | B25J 18/00 180/8.1 |
| 7,120,518 B2 | 10/2006 | Takenaka et al. | |
| 7,127,326 B2* | 10/2006 | Lewis | B25J 13/081 700/258 |
| 7,236,852 B2 | 6/2007 | Moridaira et al. | |
| 7,272,474 B1* | 9/2007 | Stentz | G01C 7/04 701/26 |
| 7,278,501 B2 | 10/2007 | Mori et al. | |
| 7,386,364 B2 | 6/2008 | Mikami et al. | |
| 7,418,312 B2 | 8/2008 | Hidai et al. | |
| 7,603,234 B2 | 10/2009 | Takenaka et al. | |
| 7,606,634 B2 | 10/2009 | Takenaka et al. | |
| 7,657,345 B2 | 2/2010 | Endo et al. | |
| 7,734,377 B2 | 6/2010 | Hasegawa | |
| 7,734,378 B2 | 6/2010 | Takenaka et al. | |
| 7,756,607 B2 | 7/2010 | Ikeuchi | |
| 7,840,308 B2 | 11/2010 | Matsunaga et al. | |
| 7,881,824 B2 | 2/2011 | Nagasaka et al. | |
| 7,949,430 B2 | 5/2011 | Pratt et al. | |
| 7,964,364 B2 | 5/2011 | Suga et al. | |
| 8,020,649 B2 | 9/2011 | Ogawa | |
| 8,060,253 B2 | 11/2011 | Goswami et al. | |
| 8,108,070 B2 | 1/2012 | Tajima | |
| 8,172,013 B2 | 5/2012 | Shimada | |
| 8,195,332 B2 | 6/2012 | Pratt et al. | |
| 8,237,390 B2 | 8/2012 | Godler | |
| 8,239,084 B2 | 8/2012 | Yamamoto et al. | |
| 8,306,657 B2 | 11/2012 | Yoshiike et al. | |
| 8,311,731 B2 | 11/2012 | Sugiura | |
| 8,332,068 B2 | 12/2012 | Goswami et al. | |
| 8,386,076 B2 | 2/2013 | Honda et al. | |
| 8,396,593 B2 | 3/2013 | Orita | |
| 8,457,830 B2 | 6/2013 | Goulding | |
| 8,532,824 B2 | 9/2013 | Orita | |
| 8,565,921 B2 | 10/2013 | Doi | |
| 8,583,283 B2 | 11/2013 | Takenaka et al. | |
| 8,630,763 B2 | 1/2014 | Goulding | |
| 8,644,987 B2 | 2/2014 | Kwon | |
| 8,676,381 B2 | 3/2014 | Kwon et al. | |
| 8,688,307 B2 | 4/2014 | Sekiya | |
| 8,738,178 B2 | 5/2014 | Choi et al. | |
| 8,781,628 B2 | 7/2014 | Kwak et al. | |
| 8,798,965 B2* | 8/2014 | Quan | G06T 17/05 345/419 |
| 8,805,582 B2* | 8/2014 | Zaier | B62D 57/032 700/245 |
| 8,825,391 B1 | 9/2014 | Urmson et al. | |
| 8,849,454 B2 | 9/2014 | Yun et al. | |
| 8,855,820 B2 | 10/2014 | Seo et al. | |
| 8,855,821 B2 | 10/2014 | Seo et al. | |
| 8,924,021 B2 | 12/2014 | Dariush et al. | |
| 8,948,956 B2 | 2/2015 | Takahashi et al. | |
| 8,965,573 B2 | 2/2015 | Maisonnier et al. | |
| 9,037,396 B2* | 5/2015 | Pack | G01C 21/30 701/409 |
| 9,044,862 B2 | 6/2015 | Kim et al. | |
| 9,102,055 B1 | 8/2015 | Konolige et al. | |
| 9,197,862 B2* | 11/2015 | Asatani | G01C 3/08 |
| 9,207,678 B2 | 12/2015 | Kim | |
| 9,266,233 B2 | 2/2016 | Kornbluh et al. | |
| 9,317,743 B2 | 4/2016 | Datta et al. | |
| 9,329,598 B2* | 5/2016 | Pack | G01C 21/30 |
| 9,352,470 B1* | 5/2016 | da Silva | B25J 13/088 |
| 9,594,377 B1* | 3/2017 | Perkins | G05D 1/021 |
| 9,789,607 B1* | 10/2017 | Whitman | B25J 13/006 |
| 9,895,804 B1* | 2/2018 | Perkins | B62D 57/032 |
| 10,017,218 B1* | 7/2018 | Swilling | B62D 57/032 |
| 2002/0183897 A1 | 12/2002 | Kuroki et al. | |
| 2003/0009259 A1 | 1/2003 | Hattori et al. | |
| 2003/0154201 A1 | 8/2003 | Berestov | |
| 2004/0044440 A1 | 3/2004 | Takenaka | |
| 2004/0063382 A1* | 4/2004 | Randall | A63H 11/205 446/377 |
| 2004/0099450 A1 | 5/2004 | Kwok et al. | |
| 2004/0138780 A1* | 7/2004 | Lewis | B25J 13/081 700/245 |
| 2004/0167641 A1 | 8/2004 | Kawai et al. | |
| 2004/0172165 A1 | 9/2004 | Iribe et al. | |
| 2004/0193323 A1 | 9/2004 | Higaki et al. | |
| 2004/0205417 A1 | 10/2004 | Moridaira et al. | |
| 2004/0230340 A1 | 11/2004 | Fukuchi et al. | |
| 2004/0236467 A1 | 11/2004 | Sano | |
| 2005/0021176 A1 | 1/2005 | Takenaka et al. | |
| 2005/0065650 A1* | 3/2005 | Lewis | B25J 13/081 700/245 |
| 2005/0067993 A1* | 3/2005 | Kato | B25J 19/0091 318/568.12 |
| 2005/0075755 A1 | 4/2005 | Takenaka et al. | |
| 2005/0077856 A1 | 4/2005 | Takenaka et al. | |
| 2005/0110448 A1 | 5/2005 | Takenaka et al. | |
| 2005/0113973 A1 | 5/2005 | Endo et al. | |
| 2005/0120820 A1 | 6/2005 | Takenaka et al. | |
| 2005/0216097 A1 | 9/2005 | Rifkin | |
| 2005/0228539 A1 | 10/2005 | Takenaka et al. | |
| 2005/0240307 A1 | 10/2005 | Kuroki et al. | |
| 2005/0283043 A1* | 12/2005 | Sisk | A61H 19/00 600/38 |
| 2006/0025888 A1* | 2/2006 | Gutmann | G06K 9/00664 700/245 |
| 2006/0064203 A1 | 2/2006 | Goto et al. | |
| 2006/0076167 A1 | 4/2006 | Setrakian et al. | |
| 2006/0173578 A1 | 8/2006 | Takenaka et al. | |
| 2006/0247800 A1 | 11/2006 | Takenaka et al. | |
| 2007/0003915 A1 | 1/2007 | Templeman | |

(56) References Cited

U.S. PATENT DOCUMENTS

| | | | |
|---|---|---|---|
| 2007/0021870 A1* | 1/2007 | Nagasaka | B25J 13/084 700/245 |
| 2007/0126387 A1 | 6/2007 | Takenaka et al. | |
| 2007/0150095 A1 | 6/2007 | Zaier | |
| 2007/0156283 A1 | 7/2007 | Takenaka et al. | |
| 2007/0193789 A1 | 8/2007 | Takenaka et al. | |
| 2007/0220637 A1 | 9/2007 | Endo et al. | |
| 2007/0227786 A1 | 10/2007 | Hillis et al. | |
| 2007/0241713 A1 | 10/2007 | Yamamoto et al. | |
| 2008/0065269 A1 | 3/2008 | Hasegawa | |
| 2008/0133055 A1 | 6/2008 | Hasegawa | |
| 2008/0160873 A1 | 7/2008 | Yoneda | |
| 2008/0208391 A1 | 8/2008 | Hasegawa et al. | |
| 2009/0005906 A1 | 1/2009 | Tajima | |
| 2009/0030530 A1 | 1/2009 | Martin | |
| 2009/0171503 A1 | 7/2009 | Takenaka et al. | |
| 2009/0306821 A1 | 12/2009 | Park et al. | |
| 2009/0312867 A1 | 12/2009 | Hasegawa et al. | |
| 2009/0325699 A1 | 12/2009 | Delgiannidis | |
| 2010/0017028 A1 | 1/2010 | Suga et al. | |
| 2010/0057253 A1 | 3/2010 | Kwon et al. | |
| 2010/0113980 A1 | 5/2010 | Herr et al. | |
| 2010/0126785 A1 | 5/2010 | Shimada | |
| 2010/0161120 A1 | 6/2010 | Goswami et al. | |
| 2010/0174409 A1 | 7/2010 | Park et al. | |
| 2010/0252395 A1 | 10/2010 | Lehtonen et al. | |
| 2010/0277483 A1 | 11/2010 | Lee et al. | |
| 2010/0292838 A1 | 11/2010 | Goswami et al. | |
| 2011/0009241 A1* | 1/2011 | Lane | A63B 24/0087 482/8 |
| 2011/0022232 A1 | 1/2011 | Yoshiike et al. | |
| 2011/0098856 A1* | 4/2011 | Yoshiike | B62D 57/032 700/246 |
| 2011/0098857 A1* | 4/2011 | Yoshiike | B62D 57/032 700/246 |
| 2011/0098860 A1* | 4/2011 | Yoshiike | B62D 57/032 700/260 |
| 2011/0172825 A1 | 7/2011 | Lee et al. | |
| 2011/0178637 A1 | 7/2011 | Lee et al. | |
| 2011/0224827 A1 | 9/2011 | Andoh | |
| 2011/0231050 A1 | 9/2011 | Goulding | |
| 2011/0257764 A1 | 10/2011 | Herr et al. | |
| 2011/0264264 A1 | 10/2011 | Shirokura et al. | |
| 2011/0301756 A1 | 12/2011 | Yoshiike et al. | |
| 2012/0072026 A1 | 3/2012 | Takagi | |
| 2012/0158175 A1 | 6/2012 | Lee et al. | |
| 2012/0203359 A1 | 8/2012 | Schimmels et al. | |
| 2012/0245734 A1 | 9/2012 | Yun et al. | |
| 2012/0259463 A1 | 10/2012 | Orita | |
| 2012/0277907 A1 | 11/2012 | Kim et al. | |
| 2012/0303271 A1 | 11/2012 | Chowdhary et al. | |
| 2012/0310412 A1 | 12/2012 | Seo et al. | |
| 2012/0316682 A1 | 12/2012 | Seo et al. | |
| 2012/0316683 A1 | 12/2012 | Seo et al. | |
| 2012/0316684 A1 | 12/2012 | Lee et al. | |
| 2013/0079929 A1 | 3/2013 | Lim et al. | |
| 2013/0144439 A1 | 6/2013 | Lee et al. | |
| 2013/0178983 A1 | 7/2013 | Watabe | |
| 2013/0184861 A1 | 7/2013 | Pratt et al. | |
| 2013/0206488 A1 | 8/2013 | Horinouchi | |
| 2013/0238122 A1 | 9/2013 | Hodgins et al. | |
| 2013/0238183 A1 | 9/2013 | Goulding | |
| 2014/0019082 A1 | 1/2014 | Lan et al. | |
| 2015/0049910 A1* | 2/2015 | Ptucha | G06F 16/51 382/103 |
| 2015/0051734 A1 | 2/2015 | Zheng et al. | |
| 2015/0073592 A1 | 3/2015 | Kaneko et al. | |
| 2015/0120044 A1 | 4/2015 | Cory | |
| 2015/0134079 A1 | 5/2015 | Yoon et al. | |
| 2015/0134080 A1 | 5/2015 | Roh | |
| 2015/0202768 A1 | 7/2015 | Moridaira | |
| 2018/0120116 A1* | 5/2018 | Rombouts | G01C 21/32 |
| 2018/0162469 A1* | 6/2018 | Blankespoor | B62D 57/032 |

OTHER PUBLICATIONS

Hashlamon et al., "Simple Virtual Slip Force Sensor for Walking Biped Robots," IEEE, 2013, pp. 1-5.

Kim et al., "Landing Force Controller for a Humanoid Robot: Time-Domain Passivity Approach," 2006 IEEE Conference on Systems, Man, and Cybernetics, Oct. 8-11, 2006, Taipei, Taiwan, pp. 4237-4242.

Silva et al., "Goal-Oriented Biped Walking Based on Force Interaction Control," Proceedings of the 2001 IEEE International Conference on Robotics & Automation, Seoul, Korea, May 21-26, 2001, pp. 4122-3127.

Silva et al., "Towards Force Interaction Control of Biped Walking Robots," Proceedings of 2004 IEEE/RSJ International Conference on Intelligent Robots and Systems, Sendai, Japan, Sep. 28-Oct. 2, 2004, pp. 2568-2573.

Non-Final Office Action dated Jun. 3, 2016, issued in connection with U.S. Appl. No. 14/538,777, filed Nov. 11, 2014, 16 pages.

Non-Final Office Action dated Aug. 19, 2015, issued in connection with U.S. Appl. No. 14/468,118, filed Aug. 25, 2014, 14 pages.

Notice of Allowance dated Mar. 14, 2016, issued in connection with U.S. Appl. No. 14/468,118, filed Aug. 25, 2014, 10 pages.

Non-Final Office Action dated Sep. 2, 2015, issued in connection with U.S. Appl. No. 14/468,031, filed Aug. 25, 2014, 31 pages.

Non-Final Office Action dated Mar. 23, 2016, issued in connection with U.S. Appl. No. 14/468,146, filed Aug. 25, 2014, 31 pages.

Notice of Allowance dated Mar. 2, 2016, issued in connection with U.S. Appl. No. 14/468,031, filed Aug. 25, 2014, 7 pages.

Notice of Allowance dated Jun. 24, 2016, issued in connection with U.S. Appl. No. 14/538,777, filed Nov. 11, 2014, 20 pages.

Notice of Allowance dated Jul. 21, 2016, issued in connection with U.S. Appl. No. 14/585,542, filed Dec. 30, 2014, 5 pages.

Doshi et al., "Collision Detection in Legged Locomotion using Supervised Learning", 2007, 6 pages, MIT Cambridge, US.

Koolen et al., "Capturability-Based Analysis and Control of Legged Locomotion, Part 1: Theory and Application to Three Simple Gait Models," The International Journal of Robotics Research, 2012, pp. 1094-1113, vol. 31, No. 9.

Pratt et al., "Capture Point: A Step Toward Humanoid Push Recovery," IEEE Humanoid Robots, 2006 6th IEEE-RAS International Conference, Symposium, Dec. 2-6, 2006, pp. 1-8, Genoa, Italy.

Pratt et al., "Capturability-Based Analysis and Control of Legged Locomotion, Part 2: Application to M2V2, a Lower Body Humanoid," The International Journal of Robotics Research, Apr. 2011, pp. 1-25.

Non-Final Office Action dated Apr. 15, 2016, issued in connection with U.S. Appl. No. 14/585,542, filed Dec. 30, 2014, 12 pages.

Bajracharya, et al., "High fidelity day/night stereo mapping with vegetation and negative obstacle detection for vision-in-the-loop walking," 2013 IEEE/RSJ International Conference on Intelligent Robots and Systems (IROS), Nov. 2013, pp. 3663-3670, IEEE, Tokyo, Japan.

\* cited by examiner

AUTO-HEIGHT SWING ADJUSTMENT

GOVERNMENT LICENSE RIGHTS

This invention was made with U.S. Government support under Contract No. HR00011-10-C-0025 awarded by DARPA. The Government may have certain rights with regard to the invention.

CROSS REFERENCE TO RELATED APPLICATION

The present application claims priority to U.S. patent application Ser. No. 14/709,830, filed on May 12, 2015 and entitled "Auto-Height Swing Adjustment," which is hereby incorporated by reference in its entirety.

BACKGROUND

Some types of robots can be classified as legged robotic devices in that they are equipped with one or more legs by which they are able to move about an environment. Some examples of legged robotic devices include biped, or two-legged robots, and quadruped, or four-legged robots. Legged robots may move about an environment according to a gait, or pattern of movements during locomotion. Each cycle of this pattern may be referred to as a step. A robotic device may alter certain steps based on features of the environment.

SUMMARY

The present disclosure generally relates to controlling a legged robotic device. More specifically, implementations described herein may involve adjusting a swing height of one or more legs of a robotic device. As an environment in which the robotic device is operating changes as the robotic device moves through the environment, the legged robotic device may change to various swing heights to step over features or obstacles of the environment.

A first example implementation includes (i) receiving sensor data that indicates topographical features of an environment in which a robotic device is operating, (ii) processing the sensor data into a topographical map that includes a two-dimensional matrix of cells, the cells indicating sample heights of respective portions of the environment, (iii) determining, for a first foot of the robotic device, a first step path extending from a first lift-off location to a first touch-down location, (iv) identifying, within the topographical map, a first scan patch of cells that encompass the first step path, (v) determining a first high point among the first scan patch of cells; and (vi) during the first step, directing the robotic device to lift the first foot to a first swing height that is higher than the determined first high point.

In a second example implementation, a control system is configured to (i) receive sensor data that indicates topographical features of an environment in which a robotic device is operating, (ii) process the sensor data into a topographical map that includes a two-dimensional matrix of cells, the cells indicating sample heights of respective portions of the environment, (iii) determine, for a first foot of the robotic device, a first step path extending from a first lift-off location to a first touch-down location, (iv) identify, within the topographical map, a first scan patch of cells that encompass the first step path, (v) determine a first high point among the first scan patch of cells, and (vi) during the first step, direct the robotic device to lift the first foot to a first swing height that is higher than the determined first high point.

A third example implementation includes a robotic system having (a) a first leg ending with a first foot, (b) at least one perception sensor, and (c) a control system configured to perform operations. The operations include (i) receiving sensor data that indicates topographical features of an environment in which a robotic device is operating, (ii) processing the sensor data into a topographical map that includes a two-dimensional matrix of cells, the cells indicating sample heights of respective portions of the environment, (iii) determining, for a first foot of the robotic device, a first step path extending from a first lift-off location to a first touch-down location, (iv) identifying, within the topographical map, a first scan patch of cells that encompass the first step path, (v) determining a first high point among the first scan patch of cells; and (vi) during the first step, directing the robotic device to lift the first foot to a first swing height that is higher than the determined first high point.

A fourth example implementation may include a system. The system may include (i) a means for receiving sensor data that indicates topographical features of an environment in which a robotic device is operating, (ii) a means for processing the sensor data into a topographical map that includes a two-dimensional matrix of cells, the cells indicating sample heights of respective portions of the environment, (iii) a means for determining, for a first foot of the robotic device, a first step path extending from a first lift-off location to a first touch-down location, (iv) a means for identifying, within the topographical map, a first scan patch of cells that encompass the first step path, (v) a means for determining a first high point among the first scan patch of cells; and (vi) a means for directing the robotic device to lift the first foot to a first swing height that is higher than the determined first high point during the first step.

These as well as other aspects, advantages, and alternatives will become apparent to those of ordinary skill in the art by reading the following detailed description, with reference where appropriate to the accompanying drawings. This summary and other descriptions and figures provided herein are intended to illustrate implementations by way of example only and numerous variations are possible. For instance, structural elements and process steps can be rearranged, combined, distributed, eliminated, or otherwise changed, while remaining within the scope of the implementations as claimed.

DETAILED DESCRIPTION

Figure 1:
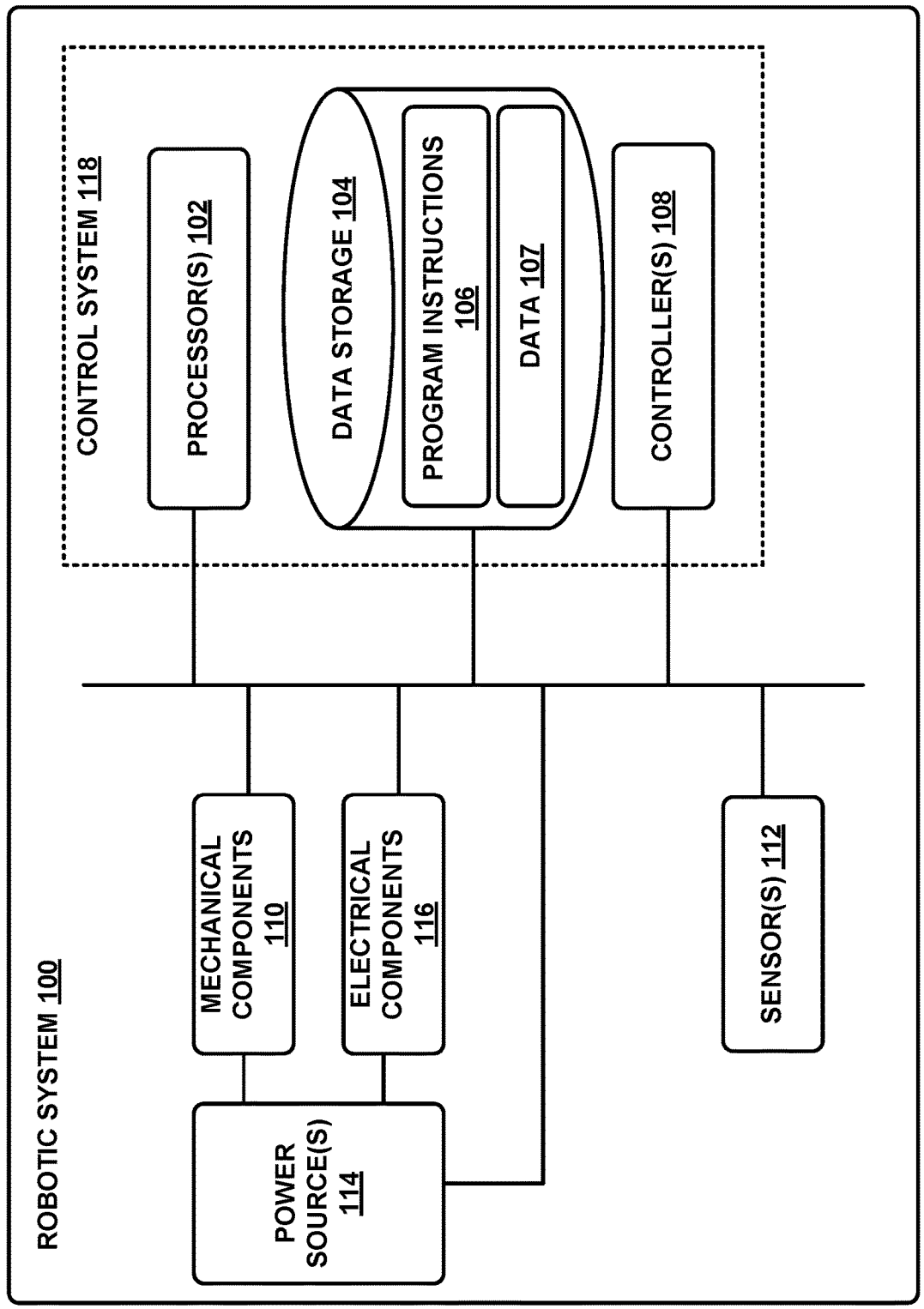
FIG. 1 illustrates a configuration of a robotic system, according to an example implementation.

Example apparatuses, systems and methods are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

I. OVERVIEW

A legged robot may include a control system that adjusts the step path of the robot's feet based on the surrounding terrain (e.g., the terrain that the robot is currently traversing or terrain that is upcoming). Example legged robots include biped robots having two legs or quadruped robots having four legs, among other possible configurations. Such legged robots may move about an environment using their legs, perhaps by moving their legs to swing their feet. Viewed from the side, the step path of a given foot may appear to have a roughly quadrilateral shape which is created by the robot picking its foot up from a support surface, stepping forward, and setting its foot back to the support surface (with the fourth side being created by the support surface). Viewed from above, the step path of the foot may appear to be a line extending from the point where the robot picks up its foot to the point where the robot sets the foot down.

A robot may adjust the step path of its feet based on the terrain that it is traversing, which may help the robot avoid tripping on features of the terrain. For instance, a robot may adjust its step path to "high-step" over obstacles and other features of the environment. However, some example robots may use relatively more energy during a high-step as compared with a "regular" step. So, in some cases, the robot may operate more efficiently by high-stepping only as necessary to avoid tripping. Moreover, reducing the height of the step so as to not raise the robot's foot unnecessarily high (i.e., high enough to clear an obstacle by an acceptable margin, but not more) may further improved efficiency.

To sense the position of obstacles, a robot may be equipped with various sensors, such as a stereo vision system. A stereo vision system may be used by the robot's control system to create a topographical map of the environment surrounding the robot. An example map may include a discretized matrix of cells each representing an area (e.g., 5 sq. cm.) of the surrounding environment. In some examples, the "value" of each cell may be based on the average height of samples within the cell and one or more standard deviations of those samples. As the robot moves through the environment, additional sensor data may be incorporated into the map so that the robot's control systems maintain a topographical sense of the environment surrounding the robot, which may assist the robot in determining the right height for each step.

The robot may also include various sensors, such as an inertial measurement unit, that provide data indicative of the robot's speed and positioning, which the robot may use to anticipate the path of the foot during the step. However, because the robot's sensors might not perfectly sense the movement of the robot relative to the environment, some uncertainty may exist as to the actual path that the foot will take relative to the environment.

Given an anticipated step path for a given step, the robot may identify a particular area, or "scan patch" of the topographical map through which the foot is likely to travel during the anticipated step. This scan patch includes discrete cells of the topographical map that surround the anticipated step path, as the robot device might trip on the topographical features represented by those cells if it does not step high enough. Because of the uncertainty that may exist as to the actual path of the foot, the scan patch may extend to some distance around the anticipated step path. Moreover, because the uncertainty may increase as the robot anticipates further ahead in time, the scan patch may widen along the step path from the anticipated foot lifting point to the anticipated foot landing point. For example, the scan patch may have an approximately trapezoidal shape in which the step path extends from the shorter of the two parallel sides to the longer of the two parallel sides. If the robot is undergoing lateral velocity, the robot may skew the scan patch in the direction of the lateral velocity, so as to shift or widen the scan patch in that direction. The amount of skew (or widening) may be proportional to the lateral velocity.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
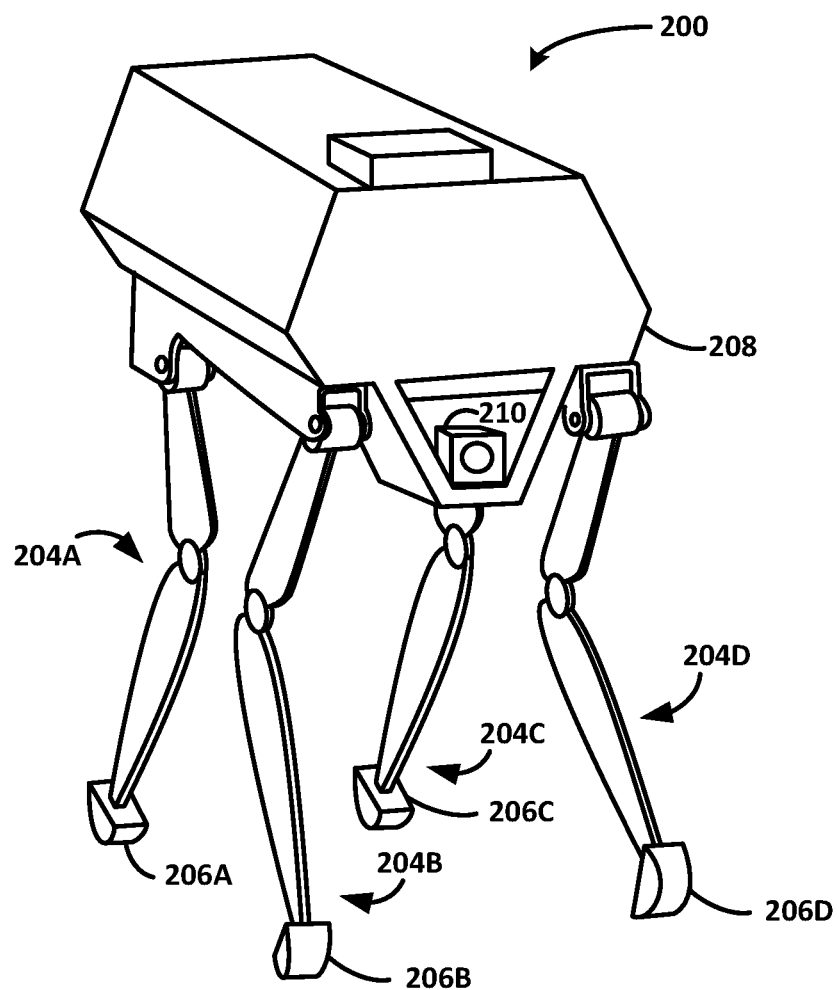
FIG. 2 illustrates a quadruped robotic device, according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
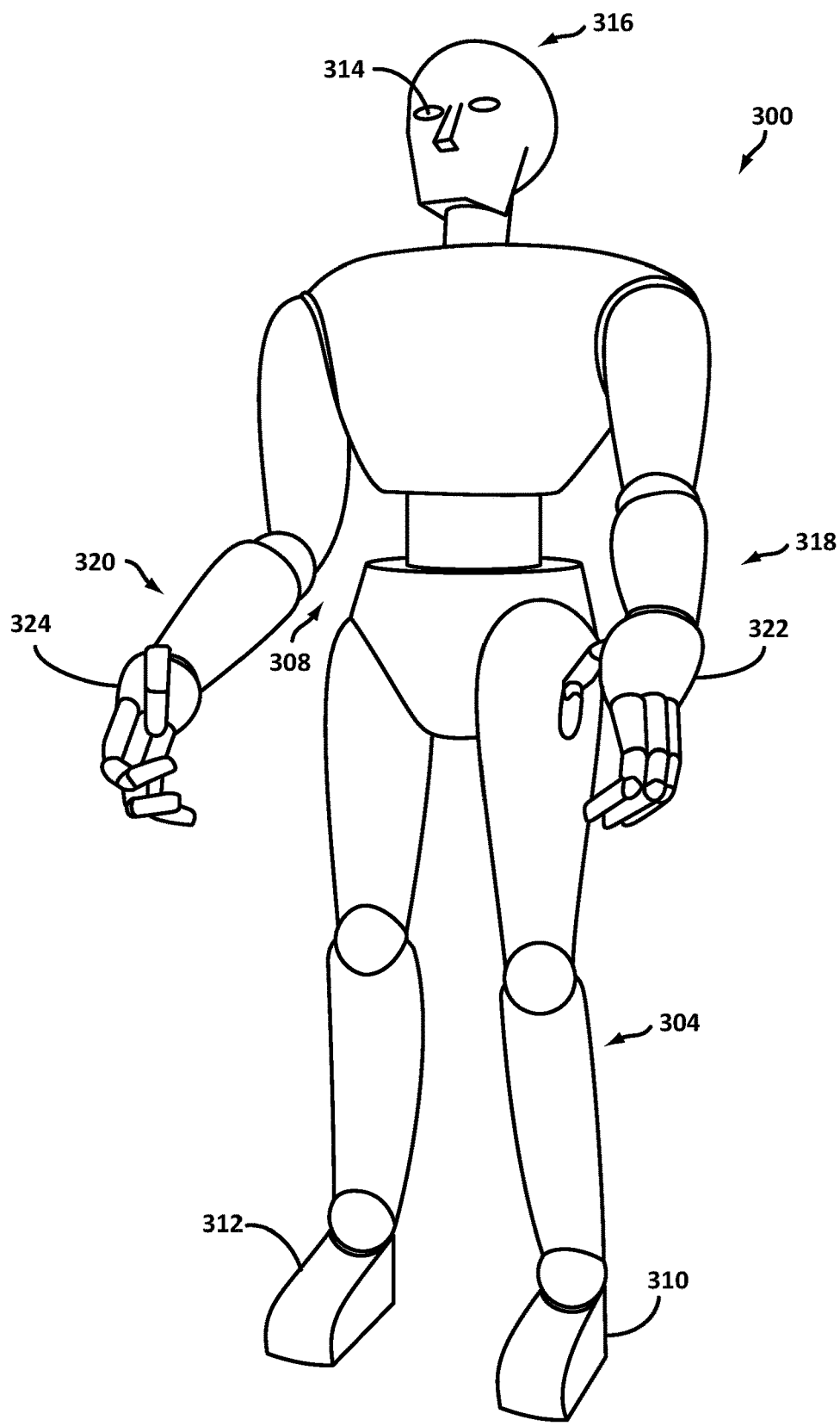
FIG. 3 illustrates a biped robotic device, according to an example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. EXAMPLE IMPLEMENTATION

Figure 4:
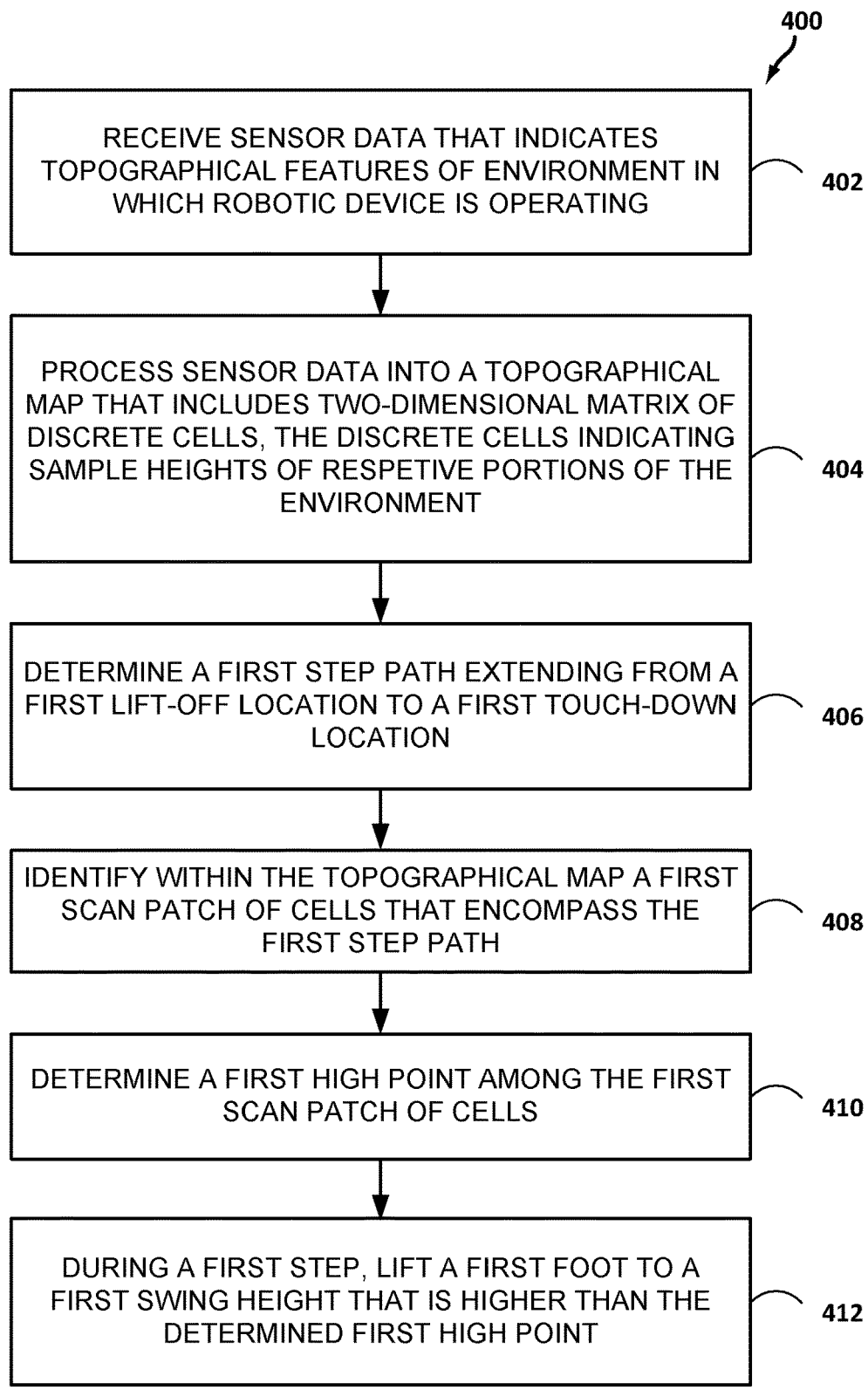
FIG. 4 is a flowchart according to an example implementation.

FIG. 4 is a flow chart illustrating an example implementation 400 of a technique to adjust the swing height of one or more feet of a robot based on the surrounding terrain. Such adjustment may help the robot avoid tripping on features of the terrain.

Implementation 400 could be used with the robotic system 100 of FIG. 1, the quadruped robot 200 in FIG. 2, and/or the biped robot 300 in FIG. 3, for example. As illustrated by blocks 402-412, implementation 400 includes one or more operations. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

Within examples, operations of FIG. 4 may be fully performed by a control system, such as control system 118 of FIG. 1, or may be distributed across multiple control systems. In some examples, the control system may receive information from sensors of a robotic device, or the control system may receive the information from a processor that collects the information. The control system could further communicate with a remote control system (e.g., a control system on another device) to receive information from sensors of this other device, for example.

In addition, for FIG. 4 and other processes and methods disclosed herein, the flow chart shows the operation of one possible implementation. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that stores data for short periods of time like register memory, processor cache and random access memory (RAM). The computer-readable medium may also include other non-transitory media, such as secondary or persistent long term storage, like read only memory (ROM), optical or magnetic disks, compact-disc read only memory (CD-ROM), for example. The computer-readable media may also be any other volatile or non-volatile storage system. The computer-readable medium may be considered a computer-readable storage medium, a tangible storage device, or other article of manufacture, for example. The program code (or data for the code) may also be stored or provided on other media including communication media. In addition, for FIG. 4 and other techniques disclosed herein, each block may represent circuitry that is arranged to perform the specific logical functions in the process.

At block 402 of FIG. 4, the example implementation 400 involves receiving sensor data that indicates topographical features of an environment in which a robotic device is operating. For instance, control system 118 of robotic system 100 shown in FIG. 1 may receive sensor data from sensor(s) 112, perhaps by way of data 107. In some embodiments, the sensor(s) 112 monitor the environment in real time, and generate data indicating obstacles, elements of the terrain, weather conditions, temperature, and/or other aspects of the environment.

As noted above, sensor(s) 112 include one or more sensors that, in operation, generate data indicative of topographical features of an environment in which robotic system 100 is operating. As noted above, these sensors may include one or more cameras. For instance, some embodiments may include stereoscopic cameras to provide 3D vision data. As noted above, other examples sensors include RADAR, LIDAR, SONAR, VICON®, a global positioning system (GPS) transceiver, and/or other sensors for capturing information of the environment in which the robotic system 100 is operating.

In some cases, a robotic device may maintain or have access to a map indicating topographical features of the environment. In such cases, the robotic device may receive sensor data indicating the device's location within the environment (e.g., GPS sensor data). This location may indicate topographical features of the environment by reference to the pre-existing map of the environment. For instance, a robotic device may receive sensor data indicating the robotic device's current location, and query the map for topographical features corresponding to that location of the environment.

In operation, one or more processors (e.g., processor(s) 102) of control system 118 may receive or otherwise gain access to the data generated by the sensor(s) 112. The one or more processors may analyze the data to detect obstacles, elements of the terrain, weather conditions, temperature, and/or other aspects of the environment.

At block 404 of FIG. 4, the example implementation involves processing the sensor data into a topographical map. For instance, control system 118 of FIG. 1 may receive sensor data from sensor(s) 112, which processor(s) 102 of control system 118 may process into a topographical map. As a robot moves through an environment, additional sensor data may be incorporated into the map (or a new map may be generated) such that the control system maintains a topographical sense of the environment surrounding the robot.

In some embodiments, the topographical map is represented by data indicating a matrix (or array) of discrete cells. Such a topographical map could be a two-dimensional matrix of discrete cells with each cell representing a portion (e.g., 5 sq. cm, 10 sq. cm, or another granularity) of the environment in which the robotic device is operating. Within examples, the processor(s) 102 may assign respective values to the discrete cells that indicate sample heights of respective portions of the environment. Topographical features of different heights may result in discrete cells indicating different sample heights corresponding to the different heights of the topographical features.

Within examples, the value of each cell may be based on a measure representing the average height of the cell. For instance, the processor(s) 102 may average (or otherwise process) samples from the sensor(s) 112 that correspond to the respective portions of the environment. The processor(s) 102 may also determine a standard deviation of such samples, which indicates the amount of variation within the samples of the portion. A sample height of a given discrete cell may be based on the average height of samples within the discrete cell and one or more standard deviations of those samples.

Figure 5:
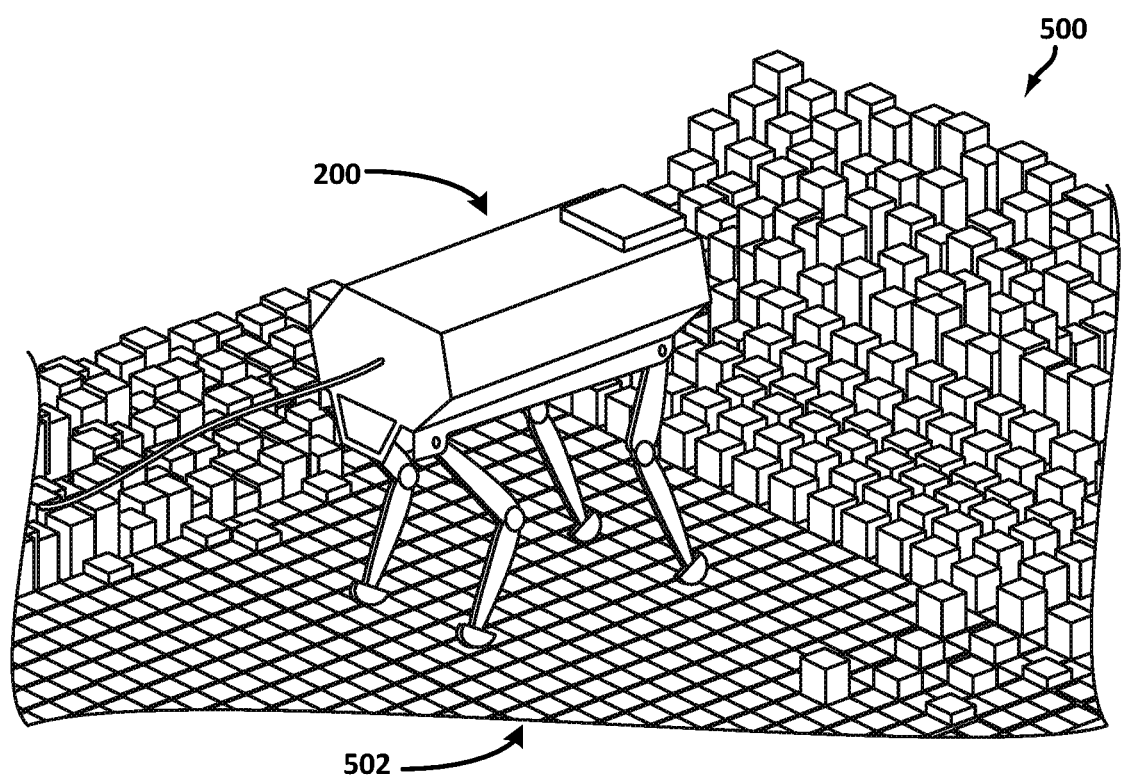
FIG. 5 is an example topographical map that represents an environment in which an example robotic device is operating according to an example implementation.

FIG. 5 is a visual representation of a topographical map 500 of an environment in which quadruped robot 200 is operating. Topographical map 500 might be created from data generated by a stereocamera system. Topographical map 500 includes a matrix 502 of discrete cells representing portions of the environment in which quadruped robot 200 is operating. Matrix 502 includes a set of cells 504 that represent a stair.

To illustrate the sample heights, the discrete cells of the two-dimensional topographical map are shown with a third dimension indicating their respective sample heights. As shown in FIG. 5 toward the edges of the topographical map 500, edge effects may be created by range limitations of the sensors(s) 112 as the sensor(s) 112 attempt to sense topographical features that are further away from the sensor(s) 112. The standard deviation of samples within these cells may also be relatively greater than the cells nearer to the quadruped robot 200, as the uncertainty associated with the height of each cell increases with distance from the sensors.

As noted above, in some cases, a robotic device may maintain or have access to a map indicating topographical features of the environment. In such cases, processing the sensor data into a topographical map may involve determining a portion of the map that corresponds to the robot's current location. Such a portion may indicate topographical features surrounding the robotic device.

At block 406, the example implementation involves determining a first step path extending from a first lift off location to a first touch-down location. Topographical features intersecting the path of a foot of a robot may interfere with a robot's step, which may cause undesirable results, such as tripping. To aid in identifying which topographical features of the environment might interfere with the step, a control system determines a step path for the foot that is taking the step. For instance, referring to FIG. 2, processor(s) 102 of a control system 118 may determine a step path for foot 206A of leg 204A. As another example, referring to FIG. 3, processor(s) 102 of a control system 118 may determine a step path for foot 310 of leg 304.

To cause a legged robot to take a step, a control system may control actuators to perform a series of actuations in which a foot of the robot is lifted from the ground, swung forward (or backward), and lowered back to the ground. As noted above, robotic systems, such as robotic system 100, may include mechanical components (e.g., mechanical components 110) and electrical components (e.g., electrical components 116) to facilitate locomotion of the robotic system. As noted above, the pattern of movements that the legs undergo during a step can be referred to as the robot's gait. Some robots may use a variety of gaits, selecting a particular gait based on speed, terrain, the need to maneuver, and energetic efficiency, among other possible considerations.

During a step, a given foot may follow a step path. The step path for a given foot may extend from a lift-off location to a touch-down location. The lift-off location refers to the location in which the given foot is lifted off of the ground, while the touch-down location refers to the location in which the given foot is lowered back to the ground. As noted above, when viewed from the side, the step path of a given foot may appear to have a roughly quadrilateral shape which is created by the robot picking its foot up from a support surface, stepping forward, and setting its foot back to the support surface (with the fourth side of the quadrilateral being created by the support surface). Viewed from above, the step path of a given foot may appear to be a line extending from the lift-off location to the touch-down location.

To vary the speed and manner of walking, the control system of a legged robot may adjust the respective step paths of its feet. For instance, to run, the control system may lengthen the step path (for a longer stride) and increase the rate at which the actuators of the legged robot swing a foot during a step. As noted above, in some examples, a robot might be instructed to perform a particular gait in a particular direction, perhaps to move through the environment at a particular speed. Alternatively, a robot may be instructed to navigate to a particular geographical location and determine a direction, speed, and/or gait based on the environment through which the robotic device is moving en route to the geographical location.

Some gaits may have pre-determined step paths. Using such a gait, while taking a step, a foot of the robotic device follows a pre-planned path from a lift-off location to a touch-down location. With pre-planned step paths, the control system might not adjust the step path on a step-by-step basis, but instead use a similar step path for multiple steps.

Other gaits might not have pre-determined step paths. In such cases, a control system may anticipate the step path of a given foot based on direction, speed, and/or gait, among other possible factors. As noted above, the control system may be aware of the present direction, speed, and/or gait, as the robot may have been instructed to move with a particular direction, speed, and/or gait or may have chosen a particular direction, speed, and/or gait. For instance, referring back to FIG. 5, quadruped robot 200 may use a walking gait when moving through the environment represented by topographical map 500. The control system 118 may also receive data from sensor(s) 112 that indicate direction, speed, and/or gait as sensed by the sensor(s) 112, which the control system may use to verify or adjust its estimate of the robot's actual direction, speed, and/or gait. However, because the robot's sensors might not perfectly sense the movement and positioning of the robot relative to the environment, some uncertainty may exist as to the actual path that a given foot will take relative to the environment.

In some implementations, a control system may determine step paths for the feet of a legged robot on a foot-by-foot basis. For instance, referring to FIG. 2, the control system may estimate a respective step path for feet 206A, 206B, 206C, and 206D in a given gait cycle. Within a given gait cycle, a step path for foot 206A might be referred to as a first step path, a step path for foot 206B might be referred to as a second step path, and so on for feet 206C and 206D.

At block 408 of FIG. 4, the example implementation may involve identifying, within the topographical map, a first scan patch of cells that encompass the first step path. Such a scan patch may represent cells through which the first foot might travel during the first step path. Since the topographical map represents the environment in which the robotic device is operating, the determined step path corresponds to a path within the topographical map. Accordingly, the control system may identify an area, or "scan patch," of the topographical map that encompasses the first step path. For instance, referring to FIG. 2, processor(s) 102 of a control system 118 may identify, within a topographical map, scan patch of cells that encompasses the determined step path for foot 206A of leg 204A. As another example, referring to FIG. 3, processor(s) 102 of a control system 118 may identify, within a topographical map, scan patch of cells that encompasses the determined step path for foot 310 of leg 304.

Although some example control systems might analyze the entirety of the environment surrounding the robot rather than portion of that environment (i.e., a scan patch encompassing the step path), such an approach may limit the robot. For instance, the control system may have to reduce the robot's speed in order to analyze such a large area prior to each step. Should the control system fail to analyze the environment prior to each step being taken, the risk arises that the environment will interfere with the next step. By reducing the area analyzed to a scan patch that encompasses the step path, processing time may be reduced, which may assist the control system in analyzing the relevant portion of the environment prior to each step.

Figure 6A:
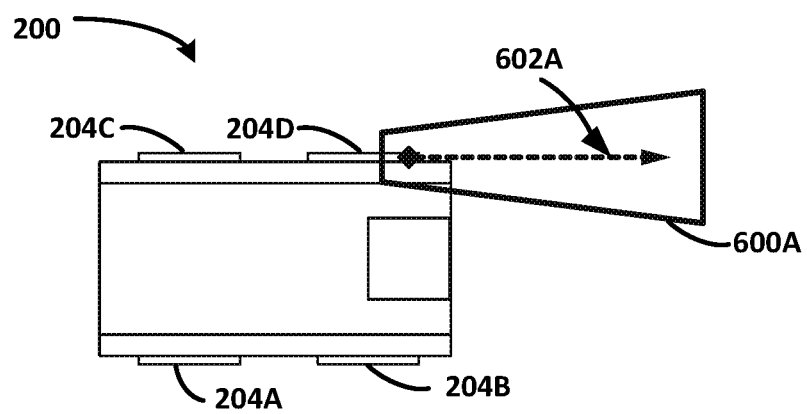
FIG. 6A illustrates an example scan patch according to an example implementation.

FIG. 6A illustrates an example scan patch 600A that encompasses a determined step path 602A of foot 206D (connected to leg 204D of quadruped robot 200). As noted above, some uncertainty may exist as to the actual path that a given foot will take relative to the environment. Because of this uncertainty, the scan patch may extend to some distance around step path 602A, as shown.

Moreover, because the uncertainty may increase as the robot looks further ahead in time to anticipate the path of the foot, the control system may identify a scan patch that widens along the swing path from the from the lift-off location to the touch-down location, so as to include most or all cells through which the foot might travel. In other words, the identified scan patch of cells may be narrower proximate to the first lift-off location than proximate to the first touch-down location. In some cases, such a scan patch of cells may be trapezoidal, as illustrated by scan patch 600A in FIG. 6A. Trapezoidal scan patches may strike a balance between analyzing the relevant portion of the environment without being over-inclusive of non-relevant portions. However, embodiments in which non-trapezoidal scan patches are identified are also contemplated, such as ovals, rectangles or other polygonal and non-polygonal shapes. Further, since control system may process the sensor data into discrete cells of different shapes, the scan patch may have boundaries that conform to the combined shape of a particular set of discrete cells.

As noted above, in some cases, a robotic device may use a gait with pre-planned step paths. With such gaits, less uncertainty as to the path of the robot's foot may exist as compared with a dynamic gait. In such cases, the control system may identify a relatively smaller scan patch of cells, as the robot's foot may be more likely to stay within a certain area during the step. In some embodiments, the control system may identify a rectangular scan patch, as the degree of uncertainty as to a foot's position during the step might not warrant a trapezoidal scan patch.

In some cases, the robot's movement may have a velocity component that is lateral to the primary direction of travel. Such lateral velocity might be caused by forces applied by the robot (e.g., side-stepping) or by external force (e.g., wind). Lateral velocity may cause the actual step path of the foot to travel through a portion of the environment that is outside of the scan patch. To avoid this, a control system of the robot may detect the velocity of the robotic device in the lateral direction and skew the scan patch in the lateral direction such that the scan patch still encompasses the first step path. In some examples, the amount of skew varies based on the magnitude of the lateral velocity. For instance, the control system may skew the scan patch in proportion to the detected velocity of the robotic device in the lateral direction.

Figure 6B:
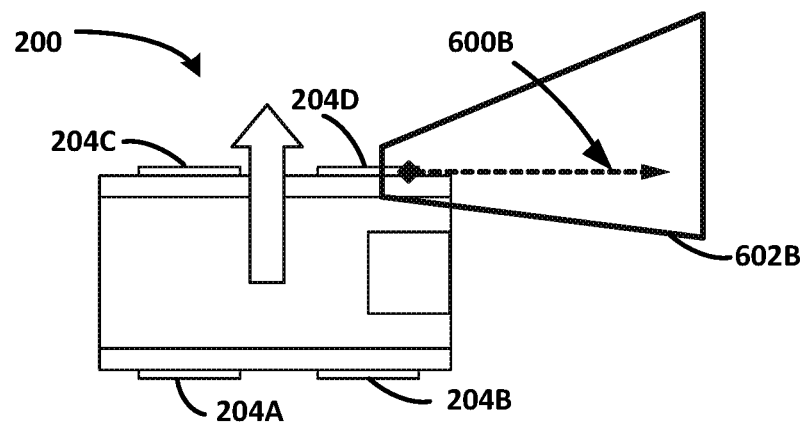
FIG. 6B illustrates another example scan patch according to an example implementation.

FIG. 6B illustrates another example scan patch 600B that encompasses a determined step path 602B of foot 206D (connected to leg 204D of quadruped robot 200). In addition to the velocity in the primary direction of travel (toward the right of the page), quadruped robot 200 also has a lateral velocity (as indicated by the arrow pointing toward the top of the page). In response, scan patch 600B is skewed in the direction of the lateral velocity.

In some cases, the lateral velocity may have a negligible effect on the actual path of the foot. In such cases, skewing the scan patch may be unnecessary. To avoid unnecessarily increasing the size of the scan patch, the control system may determine whether the detected velocity in the lateral direction exceeds a threshold lateral velocity. If so, the control system skews the scan patch in the lateral direction. If not, the control system might not skew the scan patch.

In some cases, a planar surface may be formed by two or more adjacent cells of the topographical map. For instance, adjacent cells representing a portion of the topographical map that includes a step, or a set of stairs, may form planar surfaces. To illustrate, referring back to FIG. 5, the set of cells 504 representing a stair form two planar surfaces—a vertical planar surface (the stair's rise) and a horizontal planar surface (the stair's run). In operation, a control system may identify, within the topographical map, cells forming one or more planar surfaces. To make such an identification, the control system may scan for adjacent cells having similar heights.

Within embodiments, the control system may compare the planar surfaces formed by the cells to pre-determined geometric primitives (e.g., a cuboid, or other geometric shape). In doing so, the control system may determine, from among the pre-determined geometric primitives, a particular geometric primitive that corresponds to the one or more planar surfaces. For instance, the two planar surfaces formed by the set of cells 504 in FIG. 5 may correspond to a geometric primitive of a cube. In some cases, the planar surfaces may correspond to a more complex geometric primitive, or a collection of geometric primitives (e.g., a ramp or a staircase).

A geometric primitive may approximate the height of one or more sub-portions of the environment. For instance, with a cube (e.g., a stair) the control system may assume that the environment remains a constant height across the vertical planar surface that forms the top of the cube. By identifying geometric primitive, the control system may reduce the number of cells processed, as group of cells forming a geometric primitive (or portion thereof) may be considered to have consistent height.

In some cases, a step path may pass through a portion of the environment in which a geometric primitive has been identified. In such instances, a control system may identify a portion of the geometric primitive that encompasses the first step path (e.g., a portion of a stair, or a portion of a staircase). The control system may analyze that portion of the geometric primitive in determining how high to step.

Referring back to FIG. 4, at block 410, the example implementation involves determining a first high point among the first scan patch of cells. To reduce the likelihood that the environment will interfere with the step, the robot should step higher than the tallest feature within the scan patch. Such a feature may be represented by the "high point" among the first scan patch of cells.

As noted above, the discrete cells of the topographical map may indicate sample heights of respective portions of the environment. To determine the a high point among the scan patch of cells, a control system 118 may determine a particular cell that has the greatest average sample height among the first trapezoidal scan patch of cells.

In some cases, the control system 118 may also base the high point on the respective standard deviations of the samples of each cell. As noted above, in some cases, the processor(s) 102 of the control system 118 may determine a standard deviation of the samples of a cell. Incorporating the standard deviation helps to identify a discrete cell having a low number of high samples (which might represent a tall but narrow object) that are offset by some very low samples. In such cases, the control system 118 may then determine the high point to be the cell with the greatest average sample height plus one or more standard deviations (e.g., two or three standard deviations).

Legged robots may vary in design such that different types of legged robots may be able to clear obstacles of different heights. For instance, a given robot may have a particular amount of ground clearance. The control system 118 may adjust for such differences in robot design by including an offset in the determination of the high point. For instance, the control system 118 may determine the high point to be at least the average sample height plus an offset. Within examples, the offset may be proportional to a height of the robot, which may related to the ground clearance of the robot.

Referring back to FIG. 4, at block 412, the example implementation involves directing the robotic device to lift the first foot to a first swing height that is higher than the determined first high point. For instance, referring to FIG. 2, during the first step, processor(s) 102 of a control system 118 may direct quadruped robot 200 to lift the foot 206A of leg 204A to a swing height that is higher than a determined high point within an environment that quadruped robot 200 is operating (e.g., the environment represented by topographical map 500 of FIG. 5. As another example, referring to FIG. 3, processor(s) 102 of a control system 118 may direct biped robot 300 to lift foot 310 of leg 304 to a swing height that is higher than a determined high point.

As noted above, during a step, a given foot may follow a step path that involves the robot picking its foot up from a support surface, stepping forward, and setting its foot back to the support surface. To lift the foot higher than the determined high point, the control system 118 may control actuators of the robot to lift the foot to a height that is higher than the determined high point before or as the control system 118 controls the actuators to step the foot forward. For instance, control system 118 of quadruped robot 200 may cause actuators connected to leg 206B to rotate members of leg 204B at the hip and knee joints, which causes the foot 206B to lift off of the ground. Such control of the foot may avoid the topographical features within the scan patch interfering with the step of the foot.

As noted above, because relatively more energy is used when the robot "high-steps" over obstacles, the robot may attempt to improve efficiency by high-stepping only as necessary to avoid tripping. In operation, a control system may determine whether the determined high point within the scan patch is greater than or less than a threshold obstacle height. If the determined high point within the scan patch is greater than the threshold obstacle height, the control system may direct the robotic device to lift the foot to a swing height that is higher than the determined high point. However, if the determined high point within the scan patch is less than the threshold obstacle height, the control system may direct the robotic device to lift the foot to a nominal swing height (perhaps as indicated by the gait and speed of the robot), so as to revert to a "normal" step (e.g., a step influenced by the gait and speed of the robot, rather than a particular topographical feature that the robot is attempting to avoid tripping over).

Moreover, with some example legged robots, more energy is used as the foot is lifted higher, as more work is done against the force of gravity. Accordingly, in some cases, efficiency is further improved by minimizing the height of the step as to avoid raising the foot unnecessarily high (i.e., higher than necessary to clear the topographical feature represented by the determined high point). Accordingly, the control system 118 may direct the actuators to lift the foot to a swing height that is higher than the determined first high point by an acceptable margin that minimizes the step height while clearing the obstacle. The margin may vary based on the standard deviation of the determined high point cell, as greater variability within the cell may indicate a need to increase the margin to reduce the likelihood of a trip occurring.

As noted above, in some implementations, a control system may determine step paths for the feet of a legged robot on a foot-by-foot basis. Accordingly, in operation, a control system may repeat certain operations of implementation 400 for a second, third, and/or fourth foot of a robotic system. For instance, the control system may determine, for a second foot of the robotic device, a second step path extending from a second lift-off location to a second touchdown location. The control system may then identify a second scan patch of cells that encompass the second step path. The control system may determine a second high point among second scan patch of cells, and, during the second step, direct the robotic device to lift the second foot to a second swing height that is higher than the second high point. In some cases, the determined second swing height may be different from the determined first swing height, as the second high point may differ from the first high point.

Figure 7A:
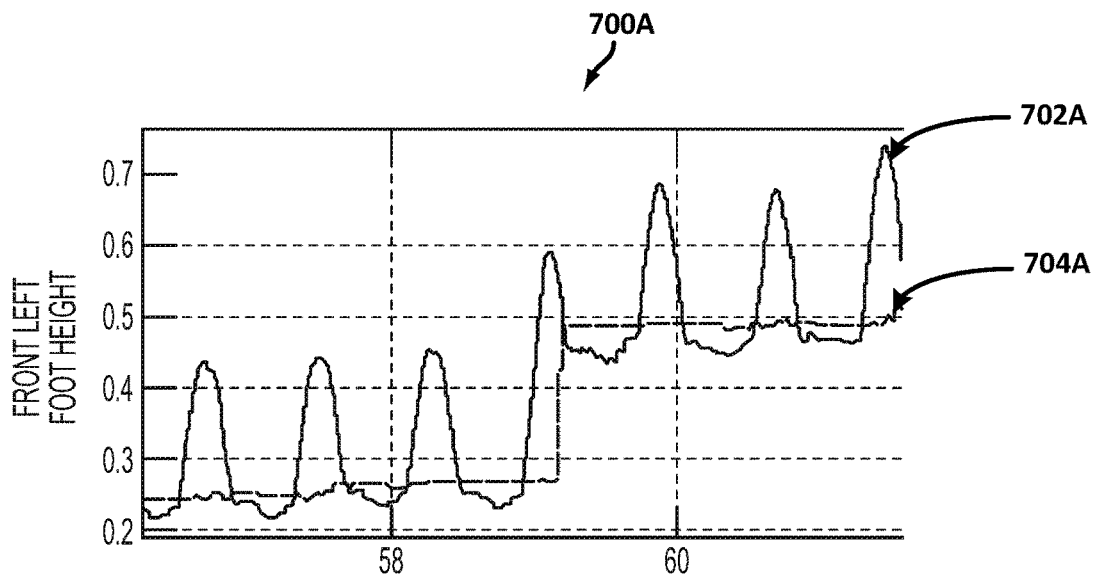
FIG. 7A is a chart showing example foot heights of a first foot during example steps according to an example implementation.

FIG. 7A shows a chart 700A showing example foot heights of a first foot during example steps of quadruped robot 200 through the environment represented by topographical map 500 of FIG. 5. Plot 702A tracks the foot height of foot 206B, while plot 704A tracks the height of the environment indicated by topographical map 500. As shown, foot 206B is lifted to a nominal foot height during the first three steps shown. As quadruped robot 200 approaches a change to higher terrain, foot 206B is lifted to a first swing height that is higher than the high point of that terrain. Foot 206B is then lifted again to the nominal foot height during the subsequent steps.

Figure 7B:
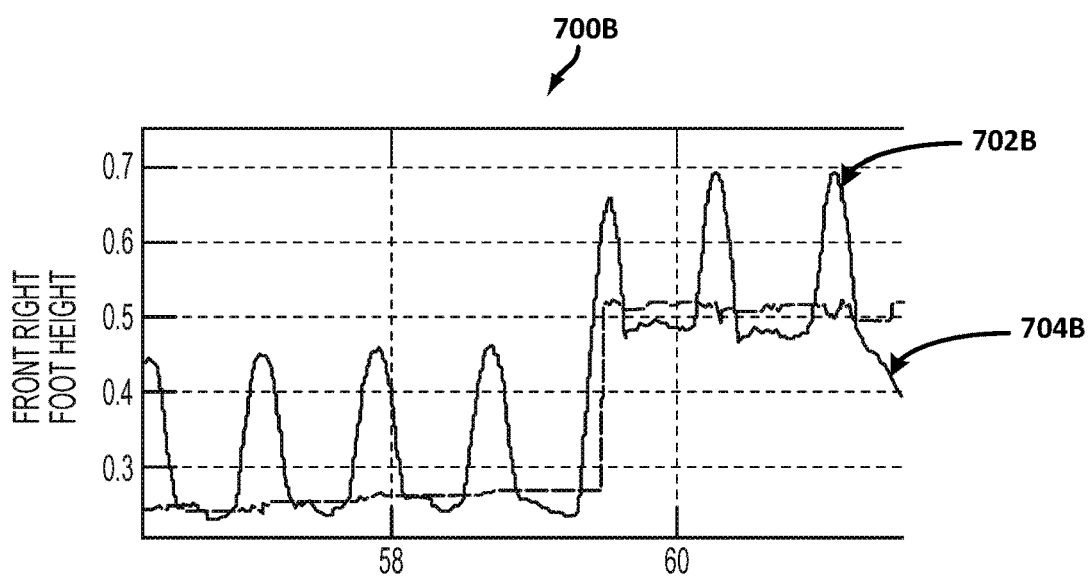
FIG. 7B is a chart showing example foot heights of a second foot during example steps according to an example implementation.

FIG. 7B shows a chart 700B showing example foot heights of a second foot during example steps of quadruped robot 200 through the environment represented by topographical map 500 of FIG. 5. Plot 702B tracks the foot height of foot 206D, while plot 704B tracks the height of the environment indicated by topographical map 500. As shown, foot 206D is lifted to a nominal foot height during the first four steps shown. As quadruped robot 200 approaches the change to higher terrain, foot 206D is lifted to a second swing height that is higher than the high point of that terrain (and different from the first swing height to which foot 206B was lifted). Foot 206D is then lifted again to the nominal foot height during the subsequent steps.

IV. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the diagrams, scenarios, and flow charts discussed herein, and ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A control system comprising:
   a processor; and
   a non-transitory computer readable medium storing instructions that when executed by the processor cause the processor to perform operations comprising:
   receiving, from a robotic device, sensor data that indicates a topographical feature of an environment in which the robotic device is operating;
   based on the sensor data, generating a topographical map that includes a plurality of cells that indicate sample heights of the topographical feature, each cell of the plurality of cells indicating two or more respective sample heights and a respective standard deviation of the respective sample heights;
   determining a first high point corresponding to a highest sample height and the respective standard deviation of the respective sample heights indicated by one or more cells of the plurality of cells of the topographical map, wherein the one or more cells of the plurality of cells encompass a first step path through which a first foot of the robotic device is to travel; and
   while the robotic device is carrying out the first step path:
     determining whether the first high point is greater than a threshold obstacle height, the threshold obstacle height corresponding to a minimum height in the environment that causes interference with a nominal swing height of the first foot; and
     when the first high point is greater than the threshold obstacle height, causing the robotic device to lift the first foot from a support surface to a first swing height that is higher than the first high point, swing the first foot forward, and lower the first foot to the support surface.

2. The control system of claim 1, wherein the operations further comprise:
   determining a second high point corresponding to a highest sample height of the sample heights indicated by one or more other cells of the plurality of cells of the topographical map, wherein the one or more other cells of the plurality of cells encompass a second step path through which a second foot of the robotic device is to travel; and
   while the robotic device is carrying out the second step path, causing the robotic device to lift the second foot from the support surface to a second swing height that is higher than the second high point, swing the second foot forward, and lower the second foot to the support surface.

3. The control system of claim 2, wherein the second swing height is different from the first swing height.

4. The control system of claim 1, wherein the operations further comprise, after the robotic device carries out the first step path:
   determining a second high point corresponding to a highest sample height of the sample heights indicated by one or more other cells of the plurality of cells of the topographical map, wherein the one or more other cells of the plurality of cells encompass a second step path through which the first foot of the robotic device is to travel;
   determining that the second high point is at a height that is lesser than the threshold obstacle height; and
   while the robotic device is carrying out the second step path, causing the robotic device to lift the first foot to the nominal swing height, wherein causing the robotic device to lift the first foot to the nominal swing height is responsive to determining that the second high point is at the height that is lesser than the threshold obstacle height.

5. The control system of claim 4, wherein the nominal swing height is based at least on a gait and a velocity of the robotic device.

6. The control system of claim 1, wherein the operations further comprise identifying the one or more cells of the plurality of cells that encompass the first step path through which the first foot of the robotic device is to travel.

7. The control system of claim 6, wherein identifying the one or more cells of the plurality of cells that encompass the first step path comprises:
   detecting a velocity of the robotic device in a lateral direction; and
   skewing the one or more cells of the plurality of cells in the lateral direction such that the one or more cells of the plurality of cells still encompass the first step path.

8. The control system of claim 7, wherein skewing the one or more cells of the plurality of cells in the lateral direction such that the one or more cells of the plurality of cells still encompass the first step path comprises skewing the one or more cells of the plurality of cells in proportion to the detected velocity of the robotic device in the lateral direction.

9. The control system of claim 7, wherein identifying the one or more cells of the plurality of cells that encompass the first step path further comprises:
   determining that the detected velocity in the lateral direction exceeds a threshold lateral velocity, and
   wherein skewing the one or more cells of the plurality of cells is responsive to determining that the detected velocity in the lateral direction exceeds the threshold lateral velocity.

10. The control system of claim 1, wherein each cell of the plurality of cells of the topographical map indicates two or more respective sample heights, and wherein determining the first high point corresponding to the highest sample height and the respective standard deviation of the respective sample heights indicated by the one or more cells of the plurality of cells of the topographical map comprises:
    for each cell of the one or more cells of the plurality of cells that encompass the first step path, averaging the respective sample heights to determine a respective average sample height;
    determining a particular cell, from among the one or more cells of the plurality of cells, that has a greatest average sample height among the determined respective average samples heights;

determining the respective standard deviation of the respective sample heights indicated by the particular cell; and determining the first high point to be at least the respective average sample height of the particular cell plus one or more respective standard deviations of the respective sample heights indicated by the particular cell.

11. The control system of claim 10, wherein determining the first high point corresponding to the highest sample height and the respective standard deviation of the respective sample heights indicated by the one or more cells of the plurality of cells of the topographical map further comprises determining the first high point to be at least the respective average sample height of the particular cell plus one or more respective standard deviations of the respective sample heights indicated by the particular cell plus an offset proportional to a height of the robotic device.

12. A robotic device comprising:
a first leg ending with a first foot;
a sensor; and
a control system configured to:
receive, from the sensor, sensor data that indicates a topographical feature of an environment in which the robotic device is operating;
based on the sensor data, generate a topographical map that includes a plurality of cells that indicate sample heights of the topographical feature, each cell of the plurality of cells indicating two or more respective sample heights and a respective standard deviation of the respective sample heights;
determine a first high point corresponding to a highest sample height and the respective standard deviation of the respective sample heights indicated by one or more cells of the plurality of cells of the topographical map, wherein the one or more cells of the plurality of cells encompass a first step path through which the first foot is to travel; and
while the robotic device is carrying out the first step path:
determine whether the first high point is greater than a threshold obstacle height, the threshold obstacle height corresponding to a minimum height in the environment that causes interference with a nominal swing height of the first foot; and
when the first high point is greater than the threshold obstacle height, cause the robotic device to lift the first foot from a support surface to a first swing height that is higher than the first high point, swing the first foot forward, and lower the first foot to the support surface.

13. The robotic device of claim 12, further comprising a second leg ending with a second foot, wherein the control system is further configured to:
determine a second high point corresponding to a highest sample height of the sample heights indicated by one or more other cells of the plurality of cells of the topographical map, wherein the one or more other cells of the plurality of cells encompass a second step path through which the second foot is to travel; and
while the robotic device is carrying out the second step path, cause the robotic device to lift the second foot from the support surface to a second swing height that is higher than the second high point, swing the second foot forward, and lower the second foot to the support surface.

14. The robotic device of claim 12, wherein the control system is further configured to, after the robotic device carries out the first step path:
determine a second high point corresponding to a highest sample height of the sample heights indicated by one or more other cells of the plurality of cells of the topographical map, wherein the one or more other cells of the plurality of cells encompass a second step path through which the first foot of the robotic device is to travel;
determine that the second high point is at a height that is lesser than the threshold obstacle height; and
while the robotic device is carrying out the second step path, cause the robotic device to lift the first foot to the nominal swing height, wherein causing the robotic device to lift the first foot to the nominal swing height is responsive to determining that the second high point is at the height that is lesser than the threshold obstacle height.

15. A method comprising:
receiving, by a control system from a sensor, sensor data that indicates a topographical feature of an environment in which a robotic device is operating;
based on the sensor data, generating, by the control system, a topographical map that includes a plurality of cells that indicate sample heights of the topographical feature, each cell of the plurality of cells indicating two or more respective sample heights and a respective standard deviation of the respective sample heights;
determining, by the control system, a first high point corresponding to a highest sample height and the respective standard deviation of the respective sample heights indicated by one or more cells of the plurality of cells of the topographical map, wherein the one or more cells of the plurality of cells encompass a first step path through which a first foot of the robotic device is to travel; and
while the robotic device is carrying out the first step path:
determine whether the first high point is greater than a threshold obstacle height, the threshold obstacle height corresponding to a minimum height in the environment that causes interference with a nominal swing height of the first foot; and
when the first high point is greater than the threshold obstacle height, cause, by the control system, the robotic device to lift the first foot from a support surface to a first swing height that is higher than the first high point, swing the first foot forward, and lower the first foot to the support surface.

16. The method of claim 15, further comprising:
determining, by the control system, a second high point corresponding to a highest sample height of the sample heights indicated by one or more other cells of the plurality of cells of the topographical map, wherein the one or more other cells of the plurality of cells encompass a second step path through which a second foot of the robotic device is to travel; and
while the robotic device is carrying out the second step path, causing, by the control system, the robotic device to lift the second foot from the support surface to a second swing height that is higher than the second high point, swing the second foot forward, and lower the second foot to the support surface.

17. The method of claim 15, further comprising:
determining, by the control system, a second high point corresponding to a highest sample height of the sample heights indicated by one or more other cells of the plurality of cells of the topographical map, wherein the one or more other cells of the plurality of cells encompass a second step path through which the first foot of the robotic device is to travel;

determining, by the control system, that the second high point is at a height that is lesser than threshold obstacle height; and while the robotic device is carrying out the second step path, causing, by the control system, the robotic device to lift the first foot to the nominal swing height, wherein causing the robotic device to lift the first foot to the nominal swing height is responsive to determining that the second high point is at the height that is lesser than the threshold obstacle height.

* * * * *